(12) United States Patent
Van Datta

(10) Patent No.: US 7,792,988 B2
(45) Date of Patent: *Sep. 7, 2010

(54) PEER-TO-PEER DATA RELAY

(75) Inventor: Glen Van Datta, San Diego, CA (US)

(73) Assignee: Sony Computer Entertainment America, LLC, Foster City, CA (US)

(*) Notice: Subject to any disclaimer, the term of this patent is extended or adjusted under 35 U.S.C. 154(b) by 1170 days.

This patent is subject to a terminal disclaimer.

(21) Appl. No.: 10/970,120

(22) Filed: Oct. 20, 2004

(65) Prior Publication Data

US 2005/0108427 A1 May 19, 2005

Related U.S. Application Data

(63) Continuation-in-part of application No. 10/700,798, filed on Nov. 3, 2003.

(60) Provisional application No. 60/513,098, filed on Oct. 20, 2003.

(51) Int. Cl.
*G06F 15/173* (2006.01)

(52) U.S. Cl. ...................... 709/238; 709/227

(58) Field of Classification Search ................ 709/200, 709/238, 227
See application file for complete search history.

(56) References Cited

U.S. PATENT DOCUMENTS

| | | | | |
|---|---|---|---|---|
| 5,768,531 A | * | 6/1998 | Lin | 709/242 |
| 5,898,679 A | * | 4/1999 | Brederveld et al. | 370/315 |
| 6,549,786 B2 | * | 4/2003 | Cheung et al. | 455/524 |
| 6,640,241 B1 | * | 10/2003 | Ozzie et al. | 709/204 |

(Continued)

FOREIGN PATENT DOCUMENTS

EP 0 913 965 5/1999

(Continued)

OTHER PUBLICATIONS

Steven Hessing: "Peer to Peer Messaging Protocol (PPMP)" Internet Draft, Apr. 2002, pp. 1-57, XP015001173.

(Continued)

*Primary Examiner*—Salad Abdullahi
*Assistant Examiner*—El Hadji M Sall
(74) *Attorney, Agent, or Firm*—Frommer Lawrence & Haug LLP; William S. Frommer; Paul A. Levy

(57) ABSTRACT

Methods and apparatus for relaying data in a peer-to-peer network. In one implementation, a wireless device includes: an antenna; a wireless communication interface connected to said antenna and supporting wireless communication across a wireless connection provided by said antenna; storage supporting storing data; and a controller connected to said wireless interface and to said storage, supporting an application service, a message service, and a relay service for relay messages; wherein said application service provides execution and management of one or more application programs accessible by said controller using application data stored in said storage, said message service provides building messages and processing received messages, and said relay service provides building a new relay message indicating a selected recipient to which the wireless device does not have a direct wireless connection, sending a built new relay message, and sending a received relay message that indicates a recipient other than the wireless device.

10 Claims, 7 Drawing Sheets

U.S. PATENT DOCUMENTS

| | | | |
|---|---|---|---|
| 6,772,219 B1 * | 8/2004 | Shobatake | 709/238 |
| 7,120,429 B2 * | 10/2006 | Minear et al. | 455/419 |
| 7,197,565 B2 * | 3/2007 | Abdelaziz et al. | 709/226 |
| 7,340,500 B2 * | 3/2008 | Traversat et al. | 709/201 |
| 7,346,015 B2 * | 3/2008 | Shipman | 370/310 |
| 2001/0044339 A1 | 11/2001 | Cordero et al. | |
| 2002/0055989 A1 | 5/2002 | Stringer-Calvert et al. | |
| 2002/0119821 A1 | 8/2002 | Sen et al. | |
| 2002/0184310 A1 | 12/2002 | Traversat et al. | |
| 2003/0055892 A1 | 3/2003 | Huitema et al. | |
| 2003/0079003 A1 | 4/2003 | Burr | |
| 2005/0113022 A1 * | 5/2005 | Pearson | 455/11.1 |

FOREIGN PATENT DOCUMENTS

| | | |
|---|---|---|
| EP | 1 107 508 | 6/2001 |
| WO | WO 02/11366 | 2/2002 |
| WO | WO 03/069495 | 8/2003 |

OTHER PUBLICATIONS

Song Jiang et al: "FloodTrial : an efficient file search technique in unstructured peer-to-peer systems" GLOBECOM 2003, vol. 5, Dec. 1, 2003, pp. 2891-2895, XP010678188.

Dutkiewicz E Ed—Institute of Electrical and Electronics Engineers: "Impact of transmit range on throughput performance in mobile ad hoc networks" ICC 2001. 2001 IEEE International Conference on Communications. Conference Record. Helsinky, Finland, Jun. 11-14, 2001, IEEE International Conference on Communications, New York, NY: IEEE, US, vol. vol. 1 of 10, Jun. 11, 2001, pp. 2933-2937, XP 010553662 ISBN: 0-7803-7097-1.

Kim Y Ed—Association for Computing Machinery: "Simple and Fault—Tolerant Key Agreement by Dynamic Collaborative Groups" Proceedings of the $7^{th}$ ACM Conference on Computer and Communications Security. CS 2000. Athens, Greece, Nov. 1-4, 2000, ACM Conference on Computer and Communications Security, New Your, NY: ACM, US, vol. Conf. 7, Nov. 1, 2000, pp. 1-38, XP 002951317 ISBN: 1-58113-203-4.

"User's Guide HP IPAQ Pocket Prestige Crystal H5100 and H5500, part nbr. 304926-001" 'Online! May 2003, pp. 6.1-6.4, XP002344472 Retrieved from the Internet: URL:www.hp.org> retrieved on Sep. 12, 2005! p. 6.1-p. 6.4.

* cited by examiner

300

PEER-TO-PEER DATA RELAY

This application claims the benefit of U.S. Provisional Application No. 60/513,098 filed Oct. 20, 2003, the disclosure of which is incorporated herein by reference.

This application is a continuation-in-part of U.S. patent application Ser. No. 10/700,798 filed Nov. 3, 2003, the disclosure of which is incorporated herein by reference.

BACKGROUND

In a typical peer-to-peer network (or "P2P network"), each member (or peer) in the peer-to-peer network establishes a connection to each of the other members. Using these direct peer-to-peer connections, the members send data to and request data from the other members directly, rather than using a centralized server (e.g., compared to a typical client-server network where members interact through the server), though the data may pass through other network devices, such as a router or access point. The connections can be wired (e.g., using a network cable to connect to a peer or a network) or wireless (e.g., using an interface supporting an IEEE 802.11 or "Wi-Fi" protocol). Typically, each member in the network has similar responsibilities in the network and the members are considered generally equivalent (as network members). For example, in a peer-to-peer network with N peers, each peer has N−1 connections to other peers.

In some peer-to-peer networks, a server is also used by the members for some centralized services, such as address discovery (e.g., for establishing the connections for building the peer-to-peer network).

SUMMARY

The present invention provides methods and apparatus for relaying data in a peer-to-peer network. In one implementation, a wireless device includes: an antenna; a wireless communication interface connected to said antenna and supporting wireless communication across a wireless connection provided by said antenna; storage supporting storing data; and a controller connected to said wireless interface and to said storage, supporting an application service, a message service, and a relay service for relay messages; wherein said application service provides execution and management of one or more application programs accessible by said controller using application data stored in said storage, said message service provides building messages and processing received messages, and said relay service provides building a new relay message indicating a selected recipient to which the wireless device does not have a direct wireless connection, sending a built new relay message, and sending a received relay message that indicates a recipient other than the wireless device.

In another implementation, a method of sending a relay message includes: selecting a recipient device for a relay message at a sending device; building said relay message, wherein said relay message includes a recipient identifier indicating said selected recipient device; sending said relay message to at least one local device through a wireless interface; wherein said sending device has a direct connection to each of said at least one local device, and said sending device does not have a direct connection to said recipient device.

In another implementation, a method of sending a relay message includes: receiving a relay message from a sending device through a wireless interface at a relaying device, wherein said relay message includes a recipient identifier indicating a recipient device and includes application data for an application program; checking said relay message to determine whether said relaying device is said recipient device; checking a local device list indicating at least one local device to determine whether said recipient device is a local device; if said recipient device is a local device, sending said relay message from said relaying device to said recipient device through said wireless interface; and if said recipient device is not a local device, sending said relay message from said relaying device to at least one local device included in said local device list through said wireless interface; wherein said sending device has a direct connection to said relaying device, said relaying device has a direct connection to each local device indicated in said local device list, and said sending device does not have a direct connection to said recipient device.

DETAILED DESCRIPTION

Figure 1A:
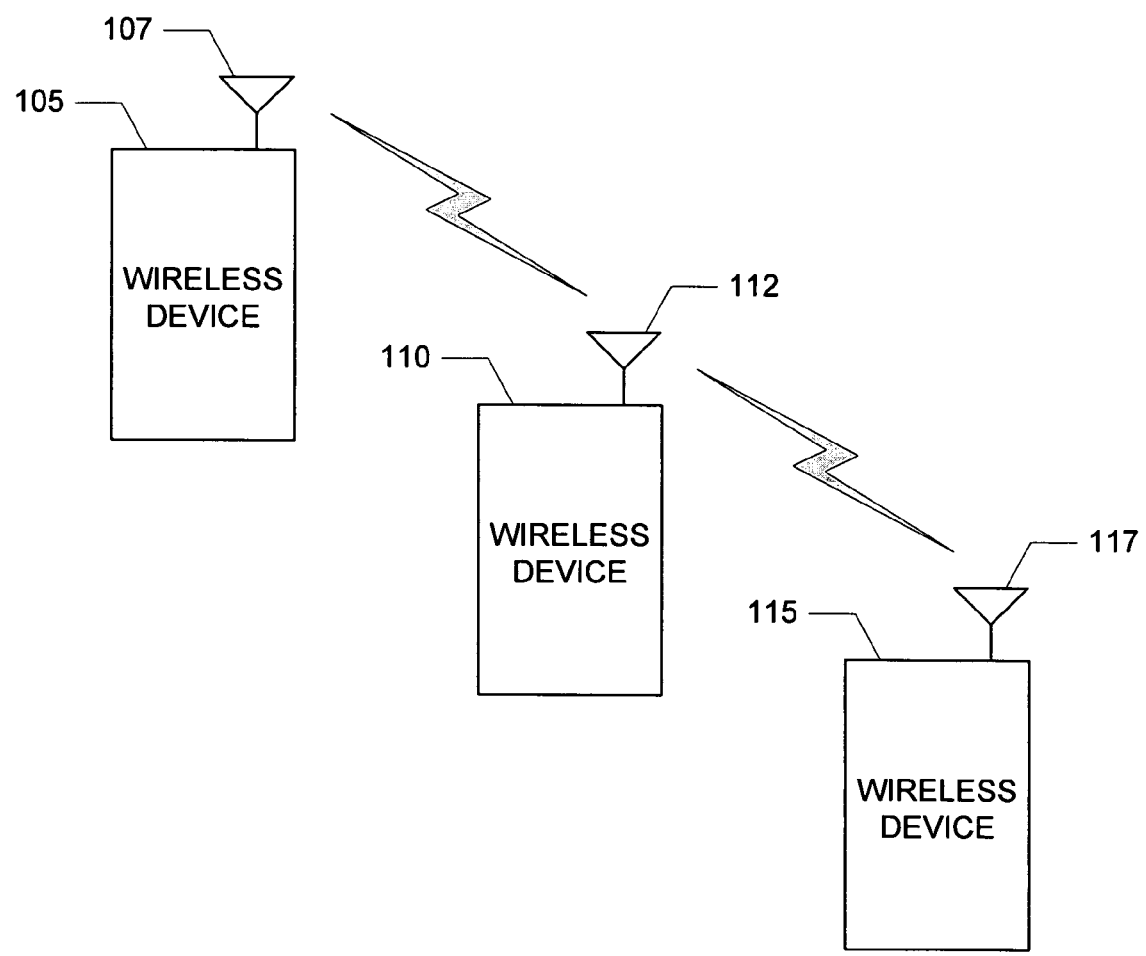
FIG. 1A shows three wireless devices in communication in a peer-to-peer network.

The present invention provides methods and apparatus for relaying data in a peer-to-peer network. In one implementation, a first wireless device and a second wireless device belong to an extended peer-to-peer network and are exchanging data to support application programs executing on the respective devices. However, the first wireless device and the second wireless devices do not have a direct connection in the peer-to-peer network. The first and second wireless devices have direct connections to one or more other wireless devices (local devices) and can trace a path through intermediary devices to reach one another. To communicate, the first wireless device builds a relay message indicating the second wireless device as the intended recipient of the relay message. The first wireless device sends the relay message to each of its local devices. The local devices receive the relay message and pass the relay message to their respective local devices, following a set of relay rules. The relay message propagates through the peer-to-peer network and reaches the second wireless device. Similarly, the second wireless device sends data to the first wireless device using relay messages.

An illustrative example of one implementation is presented below. This example is not exhaustive and additional examples and variations are also described later.

In one example, a user of a wireless game device brings the wireless game device into an area (e.g., a shop) where an extended wireless peer-to-peer network including other wireless game devices is active. In the extended peer-to-peer network, some of the devices cannot establish direct connections to one another. The wireless game devices support wireless connections of limited range, such as using interfaces supporting the Wi-Fi protocol. For two devices that are out of range, the devices cannot establish a direct connection. However, the two devices can use another intermediary device (or series of devices) as a conduit to send relay messages back and forth.

The user activates his or her wireless game device and requests a list of available devices to play a multiplayer game. The user's wireless game device builds a list of available recipients, indicating each recipient by user name or identifier, or by device identifier. The user's wireless game device builds the recipient list by contacting the other wireless game devices that are within range. These devices within range are local devices for the user's wireless game device. The local devices propagate the list request through the peer-to-peer network and accumulate information indicating the available devices, returning the information to the originator of the list request—the user's wireless game device (examples of building the list are described below).

The user selects a recipient from the recipient list and requests that the wireless game device contact the selected recipient with an invitation to play a game. The user's wireless game device checks whether the selected recipient is a local device or not. If the selected recipient is a local device, a direct connection is available between the user's wireless game device and the recipient and so the user's wireless game device will use direct communication with the selected recipient. The user's wireless game device sends an invitation message to the recipient (not through other local devices) and direct communication proceeds across the direct connection. If the selected recipient is not a local device, a direct connection is not available and so the user's wireless game device will use relay messages for relay communication with the selected recipient.

In relay communication, a wireless game device builds a relay message indicating a selected recipient and including data to be used by the selected recipient. A relay message also includes data to be used by the recipient and a relay message identifier to identify the relay message. To send an invitation to the selected recipient, the wireless game device includes appropriate information in the relay message to indicate the game, the sending device and the user, etc. For relay messages used for the game, the wireless game device includes appropriate application information in the relay messages. The user's wireless game device builds a relay message for an invitation and sends the relay message to each of the wireless game device's local devices through direct wireless connections. None of the local devices are the intended recipient for the relay message, and so these local devices are intermediary or relay devices in this relay communication. When an intermediary device receives the relay message, the intermediary device checks whether the indicated recipient is a local device of the intermediary device, using a list of its local devices. If the recipient is a local device, the intermediary device sends the relay message to the recipient. If the recipient is not a local device, the intermediary device sends the relay messages to all of its local devices according to a set of relay rules. In this example, one relay rule indicates that an intermediary device does not send a relay message back to the local device from which the relay message was received. Another rule indicates that an intermediary device does not send the same relay message again (indicated by the same relay message identifier). After sending the relay message, the intermediary device does not retain the relay message, but does record the relay message identifier to avoid re-sending the same relay message.

The relay message propagates through the peer-to-peer network and the wireless game device indicated as the recipient eventually receives the relay message. The recipient recognizes that it is the recipient and uses the included data as appropriate. When the recipient device receives the invitation from the user's wireless game device, the recipient device presents the invitation to the recipient's user and accepts appropriate instructions. The recipient device builds a relay message indicating the user's wireless game device as the recipient of this relay message and including information indicating the response to the invitation. The recipient device sends the relay message back through the peer-to-peer network to the user's wireless game device. The two devices can then continue to communicate in the same way using relay communication.

In this example, two wireless devices that do not have a direct wireless connection use other wireless devices as intermediary devices to create an indirect or relay connection. By using relay communication, the wireless devices advantageously can overcome limitations in range and expand the area and devices available for communication. Furthermore, the two wireless devices communicate through a series of peer-to-peer connections without requiring an intermediary server system. The two wireless devices can exchange data to facilitate the joint operation of application programs (e.g., a multi-player game application) without any of the intermediary devices being participants in the joint operations. For example, two wireless devices can jointly play one game using a third wireless device as a relay, while that third device is playing some other game with yet another device. Different implementations and applications can realize additional or different advantages as well.

FIG. 1A shows three wireless devices 105, 110, and 115 having respective wireless antennas 107, 112, and 117 in communication in a peer-to-peer network. The wireless devices 105, 110, 115 communicate as peers rather than through a server. In one implementation, the wireless devices 105, 110, 115 are wireless-enabled game or general-purpose computing devices (e.g., game devices, PDA's, or laptop computers supporting Wi-Fi interfaces, or cellular phones, etc.). Using its antenna 107, the wireless device 105 establishes a direct wireless connection with the wireless device 110. Similarly, the wireless devices 110 and 115 establish a direct wireless connection. In the configuration shown in FIG. 1A, the wireless device 105 and the wireless device 115 do not have a direct connection, such as because they are out of range for their wireless interfaces.

The wireless devices 105, 110, 115 exchange data (e.g., messages) across the wireless connections. The wireless device 105 communicates directly with the wireless device 110. The wireless device 110 communicates directly with both of wireless devices 105 and 115. The wireless device 115 communicates directly with the wireless device 110. As described below, the wireless device 105 can communicate indirectly with the wireless device 115 using relay communication through the wireless device 110 as an intermediary or relay device. In this way, the wireless device 110 can assist as a relay while functioning as a peer in the extended network.

Figure 1B:
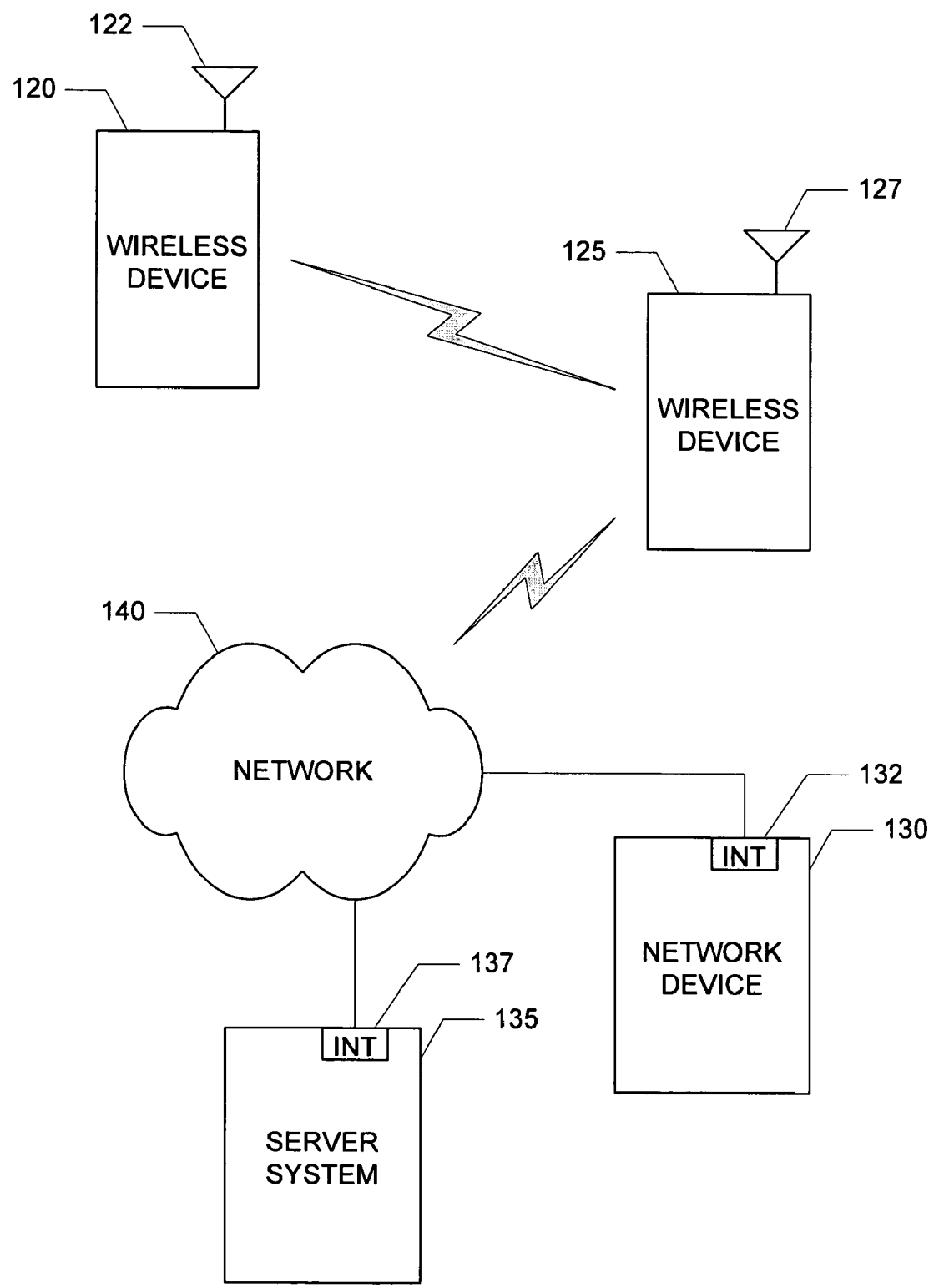
FIG. 1B shows another network environment where two wireless devices, a network device, and a server system communicate using direct and relay communication.

FIG. 1B shows another network environment where two wireless devices 120, 125, a network device 130, and a server system 135 communicate using direct and relay communication. The wireless devices 120 and 125 establish a direct wireless connection using respective antennas 122 and 127. The wireless device 125 also communicates across a wireless connection with a network 140. The network device 130 and server 135 communicate with the network 140 through wired connections using respective network interfaces 132 and 137. In one implementation, the network device 130 is a network-enabled computing device, such as a laptop computer or a game console having a network interface. In one implementation, the server 135 is a computing system providing data and/or application serving to connecting clients (such as the wireless devices 120, 125 and the network device 130). In one implementation, the network 140 is a local area network (LAN). In another implementation, the network 140 is a wider network, such as the Internet or a private intranet.

The wireless device 125 can establish direct connections to the network device 130 and the server system 135 though the network 140 (though data may pass through other network equipment, such as a base station and routers). In this configuration, a 'direct' connection is distinguished from an 'indirect' connection in that a direct connection is a peer-to-peer connection and so a first device sends a message addressed to a second device (e.g., using TCP/IP) across a direct connection to the second device. An indirect connection includes a series of two or more direct connections. For example, the wireless device 125 has a direct connection to the wireless device 125 and a direct connection to the network device 130. Accordingly, when the wireless device 125 sends messages to the network device 130, those messages are addressed to the network device 130 as a peer. The wireless device 120 has an indirect connection to the network device 130, through a first direct connection between the wireless device 120 and the wireless device 125 and a second direct connection between the wireless device 125 and the network device 130. When the wireless device 120 sends messages to the network device 130, those messages are relay messages addressed to the wireless device 125 and indicating the network device 130 as the intended recipient. In turn, the wireless device 125 relays to the network device 130 those relay messages from the wireless device 120 by sending to the network device 130 new relay messages that include the same payload data (e.g., non-addressing data) as the received relay messages but are addressed to the network device 130 using the direct connection. Alternatively, the wireless device 125 sends the same relay messages but changes the addressing information.

In one implementation, the server 135 provides centralized storage of information and so the devices provide and request information to and from the server 135 (e.g., periodically or upon demand). For example, in one implementation, the server 135 stores a list of the devices participating in the peer-to-peer network. In another example, the server 135 stores a list of local devices for each participant in the peer-to-peer network. Alternatively, the server 135 provides different information that complements the communication among the devices. For example, the server 135 stores user profiles for users of devices indexed by device identifiers.

The wireless devices 120, 125, the network device 130, and the server 135 can have flexible roles. Each can act as a peer, a client, or a server as needed. For example, the server 135 can meet a centralized storage request for the wireless device 120 and then interact as a peer with the wireless device 125.

Figure 5:
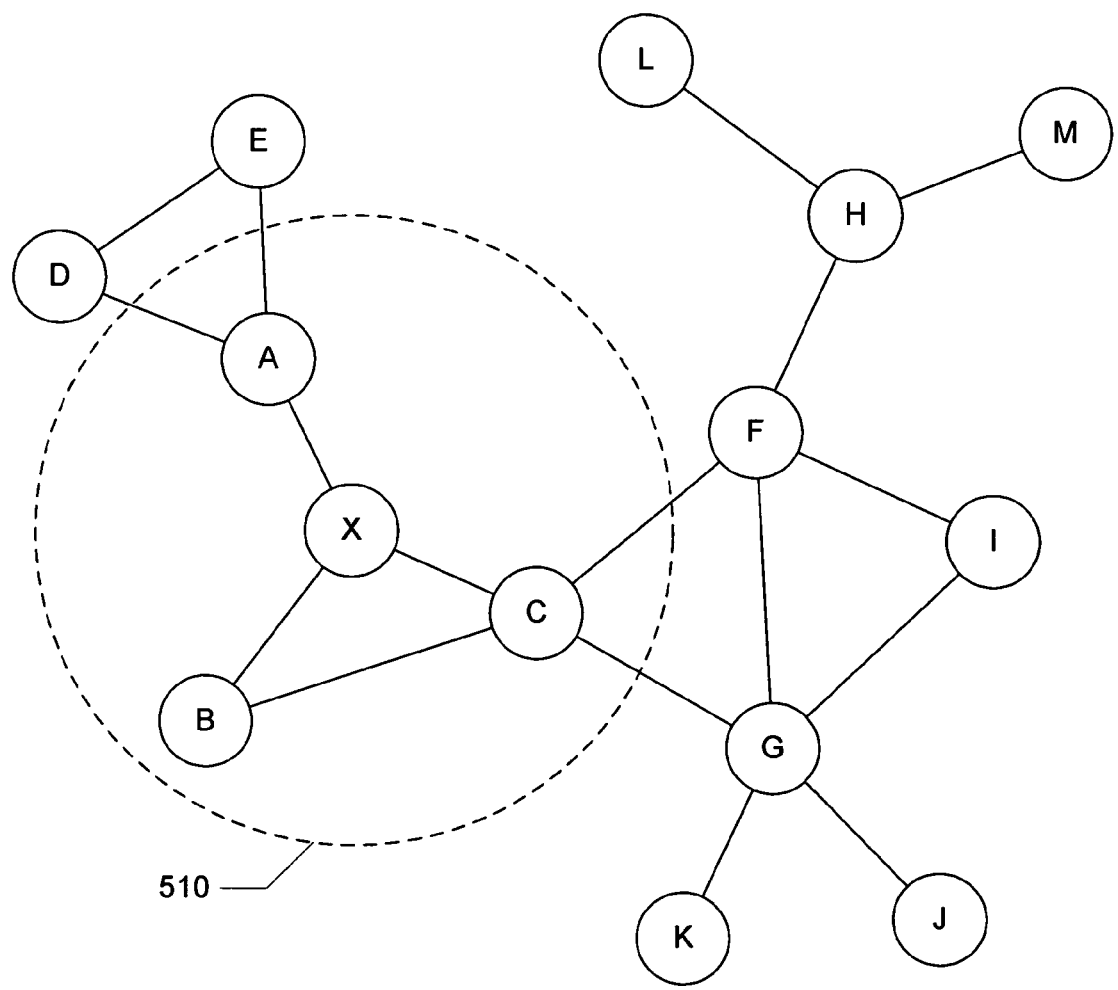
FIG. 5 shows an example of one network configuration as a graph of nodes and links.

While FIGS. 1A and 1B illustrate two network configurations, in other implementations, other network configurations can be used (see, e.g., FIG. 5). For example, in one implementation, a collection of wired network devices exchange information through a LAN or wider network, without using wireless connections. In one implementation using wired devices, a participant limit is used to control the number of devices participating in a peer-to-peer network and a local device limit is used to control the number of devices that a device considers as local devices (available for direct connections). In another example, various types of wireless devices are used, such as cellular phones and PDA's.

Figure 2:
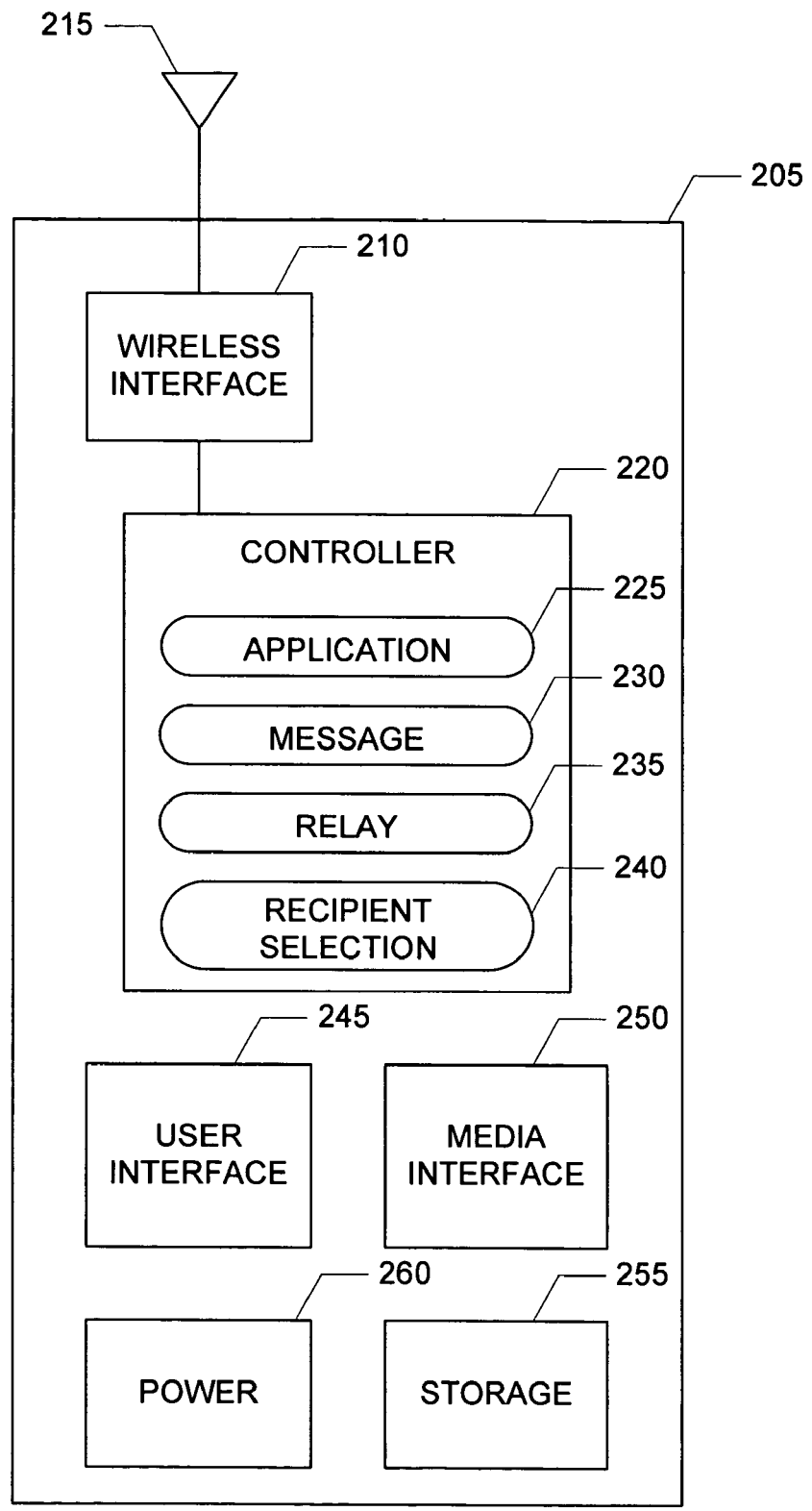
FIG. 2 shows a block diagram of one implementation of a wireless device supporting peer-to-peer relay communication.

FIG. 2 shows a block diagram of one implementation of a wireless device 205 supporting peer-to-peer relay communication. The wireless device 205 includes a wireless interface 210 connected to an antenna 215. The wireless interface 210 supports establishing a wireless connection to another wireless device using the antenna 215 and exchanging data across an open connection. In one implementation, the wireless interface 210 is a typical radio interface supporting an air interface, such as a local wireless protocol like Wi-Fi or Bluetooth. While the components of the wireless interface 210 are not shown in FIG. 2, those components and their operation will be understood by one of ordinary skill in the art (e.g., the appropriate filters, amplifiers, etc.). In another implementation, a different air interface can be supported, such as CDMA, or a non-radio interface, such as infrared. In another implementation, multiple wireless interfaces are supported and/or one or more wired interfaces (e.g., IEEE-1394 or Ethernet).

A controller 220 is connected to the wireless interface 210. The controller 220 controls the operation of the wireless device 205 and its components. In one implementation, the controller 220 is a microprocessor and related sub-systems. The controller 220 provides an application service 225, a message service 230, a relay service 235, and a recipient selection service 240. The services of the controller 220 are implemented as software programs stored in storage and executed by the controller 220. Alternatively, one or more of the services can be implemented partially or completely as hardware or in a separate sub-system of the wireless device 205. In another implementation, the controller does not provide any of these services and instead the operation of the wireless device is controlled manually by a user through the user interface of the wireless device (e.g., the controller controls the operation of the components according to the user commands as a control processor rather than providing services for automatic operation for sending messages etc.).

The application service 225 supports the execution of application programs accessible to the wireless device 205 and management of corresponding application data. In one implementation, the application service 225 supports executing game application programs.

The message service 230 supports building messages, sending messages through the wireless interface 210, and processing messages received through the wireless interface 210. The message service is primarily for messages used in direct communication.

The relay service 235 supports building relay messages, sending relay messages, and processing received relay messages, as described below (e.g., referring to FIGS. 3 and 6). The relay service 235 is primarily for messages used in relay communication and operates in conjunction with the message service (e.g., sharing sub-services such as address insertion or lower protocol layer functions). In one implementation, the relay service 235 builds and maintains a local device list indicating the devices with which the wireless device 205 can establish a direct connection.

The recipient selection service 240 supports building a list or map of available recipients for communication and selecting a recipient for communication, as described below (e.g., referring to FIGS. 4 and 5). In one implementation, the recipient list is a list of devices, with corresponding addressing information for local devices (as indicated by the local device list). The recipient list can also indicate (or reference) additional information about the recipients (e.g., user name). In another implementation, the recipient selection service 240 builds a map of available recipients, indicating both the available recipients and for each recipient that is not a local device indicating one or more intermediary devices (or connections) used to reach that recipient. The recipient selection service 240 builds the list or map by querying the local devices. Building the recipient list or map is described further below. In another implementation, the recipient selection service 240 builds a list or map using information received from a server, or obtains a list or map from a server.

The wireless device 205 also includes a user interface 245, a media interface 250, storage 255, and a power source 260. The user interface 245 provides input controls to receive user commands (e.g., a keypad, buttons, a directional pad or joystick, etc.) and output components to provide data to the user (e.g., a display and audio speakers). The media interface 250 provides components to connect to or accept media to exchange data with the media, according to the type of media. In one implementation, the media interface 250 provides an interface to removably receive an optical disc to read data from the disc (e.g., a CD-ROM drive) and another interface to connect to a removable memory component to read data from and write data to the memory component (e.g., a USB port to accept a USB memory card, a removable hard disk drive interface, or a Memory Stick™ interface). The storage 255 provides storage for data used in the operation of the wireless device 205 and in application execution. For example, in one implementation, relay messages and recipient lists are stored in the storage 255. In one implementation, the storage 255 is a combination of RAM and flash memory. In another implementation, the storage 255 also provides storage for data over a longer period, such as user data and application data and files, and includes appropriate long-term storage, such as flash memory and/or a hard disk drive. The power source 260 provides power to the components of the wireless device 205. In one implementation, the power source 260 provides an interface for drawing power from removable batteries and a rechargeable internal power source with a corresponding external power connection. In FIG. 2, the interconnections among the user interface 245, media interface 250, storage 255, and power source 260, and with the other components of the wireless device 205 are not shown for clarity, though these connections will be appreciated by one of ordinary skill.

In another implementation, a network device that is not wireless-enabled but does support an interface for communication with other devices provides similar components to the wireless device shown in FIG. 2. The network device includes a controller providing application, message, relay, and recipient selection services, and so also support relay communication as described below. As described above referring to FIG. 1B, a combination of wireless devices and network devices can be used for relay communication.

Figure 3:
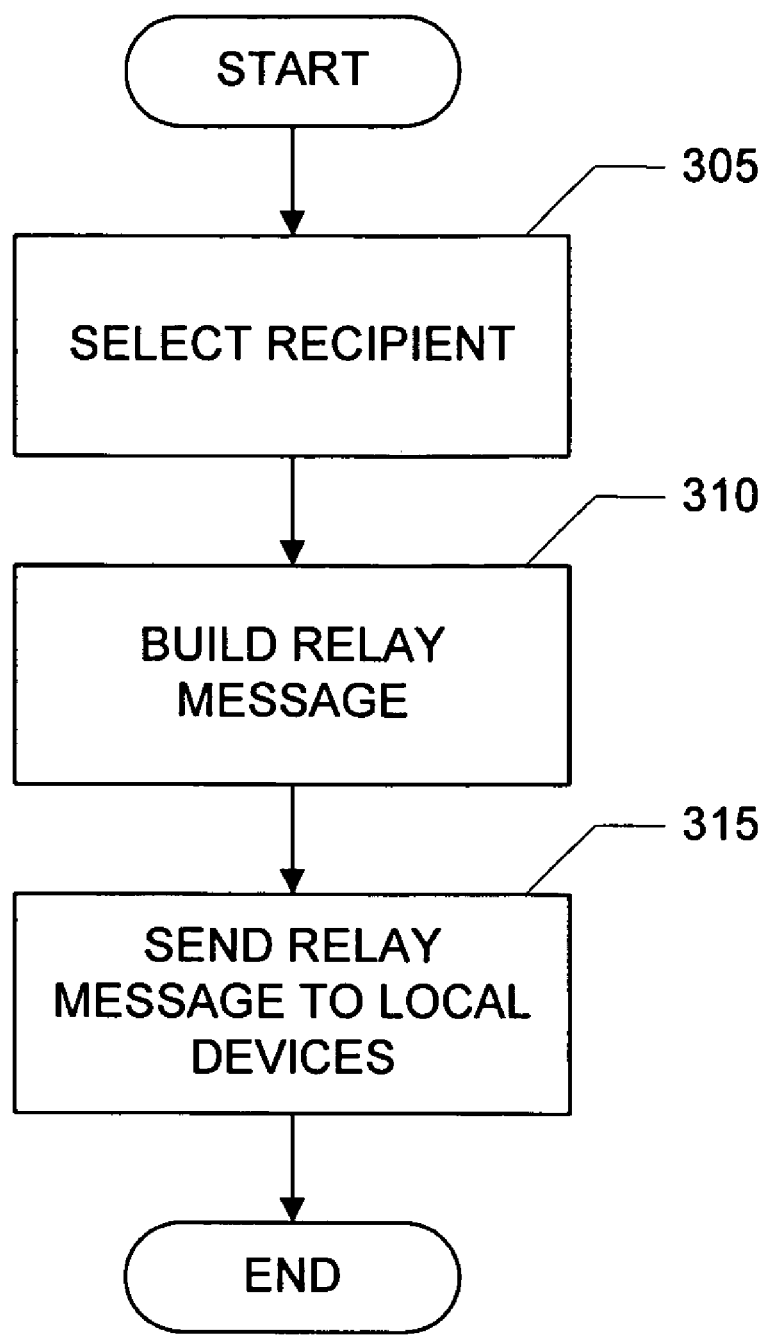
FIG. 3 shows a flowchart of one implementation of sending a relay message.

FIG. 3 shows a flowchart 300 of one implementation of sending a relay message. Initially, a wireless device supporting relay communication is participating in a peer-to-peer network. The wireless device has built a list of local devices (e.g., using a beacon) and opened direct connections to those local devices. The wireless device receives a request from a user to select a recipient.

The wireless device selects a recipient for communication, block 305. The wireless device builds a recipient map indicating available recipients and corresponding paths of connections, such as by using the techniques described below referring to FIG. 4. In another implementation, the wireless device builds a list without indicating connections, rather than a map. In one implementation, the wireless device does not build a new recipient map (or list) if the wireless device already has a recipient map and that map is current (e.g., as determined using an expiration threshold and a creation or last update timestamp of the map, or by querying local devices). In another implementation, the wireless device selects a recipient from a list or map provided by a server, or selects a recipient through a server (and optionally selecting or receiving from the server a path to the recipient).

The wireless device presents the recipient map to the user and receives a selection choice indicating a recipient. The wireless device determines whether the selected recipient is a local device or not by checking the local device list. In another implementation, the recipient list also indicates whether each recipient is a local device or not (for the wireless device storing the particular recipient list). If the selected recipient is a local device, the wireless device uses direct communication to exchange data with the selected recipient. If the selected device is not a local device, the wireless device will use relay communication.

After selecting a recipient that is not a local device, the wireless device builds a relay message, block 310. The relay message includes information indicating the selected recipient, such as a recipient identifier from the recipient list. In one implementation where the recipient list indicates a full or partial path to the recipient, the wireless device includes the path information in the relay message. In another implementation, after selecting a recipient from a list, the wireless device discovers the path to the selected device and includes the path information in the relay message. In another implementation, the relay message includes information indicating multiple recipients (e.g., a list). The relay message includes a relay message code to identify the relay message as a relay message. The wireless device assigns a relay message identifier to the relay message to identify the relay message as the message is sent through the peer-to-peer network (to identify the relay message relative to other relay messages). The wireless device includes the relay message identifier in the relay message. In one implementation, the wireless device also includes a hop count limit to limit how far through the network the relay message should propagate (hop counts are described further below). The wireless device generates appropriate additional data to be sent to the recipient and includes that data as the payload data of the relay message. For example, when the wireless device is going to play a game with the recipient device, the wireless device includes appropriate game data in the relay message.

The wireless device sends the built relay message, block 315. In one implementation, the wireless device broadcasts the relay message through the wireless interface of the wireless device, sending the relay message to all of the devices in the local device list of the wireless device. In another implementation, the wireless device sends the relay message to one or selected local devices according to path information in the relay message.

After the wireless device has opened relay communication with a recipient, the wireless device continues to build and send relay messages to the recipient as described above referring to blocks 310 and 315.

Wired devices or wireless devices including wired interfaces use similar techniques to send relay messages, selecting the appropriate interface to send relay messages for corresponding local devices.

In one implementation, the wireless device has a maximum peer count to limit the number of local devices to present as available for selection as recipients or to use as intermediary devices. The wireless device builds a first local device list indicating all the local devices available (e.g., determined by responses to a beacon). The wireless device builds a second local device list by selecting a number of devices equal to or less than the maximum peer count from the available local devices. The wireless device can use various criteria to select devices for the second list, such as response time or signal strength. In one implementation, the maximum peer count value is dynamic. The wireless device adjusts the maximum peer count based on the wireless device's current performance load (e.g., increasing the limit when the device is idle) or based on network traffic (e.g., reducing the limit when traffic is very high). In another implementation, the wireless device sets the maximum peer count based on information from the user or from a server.

Figure 4:
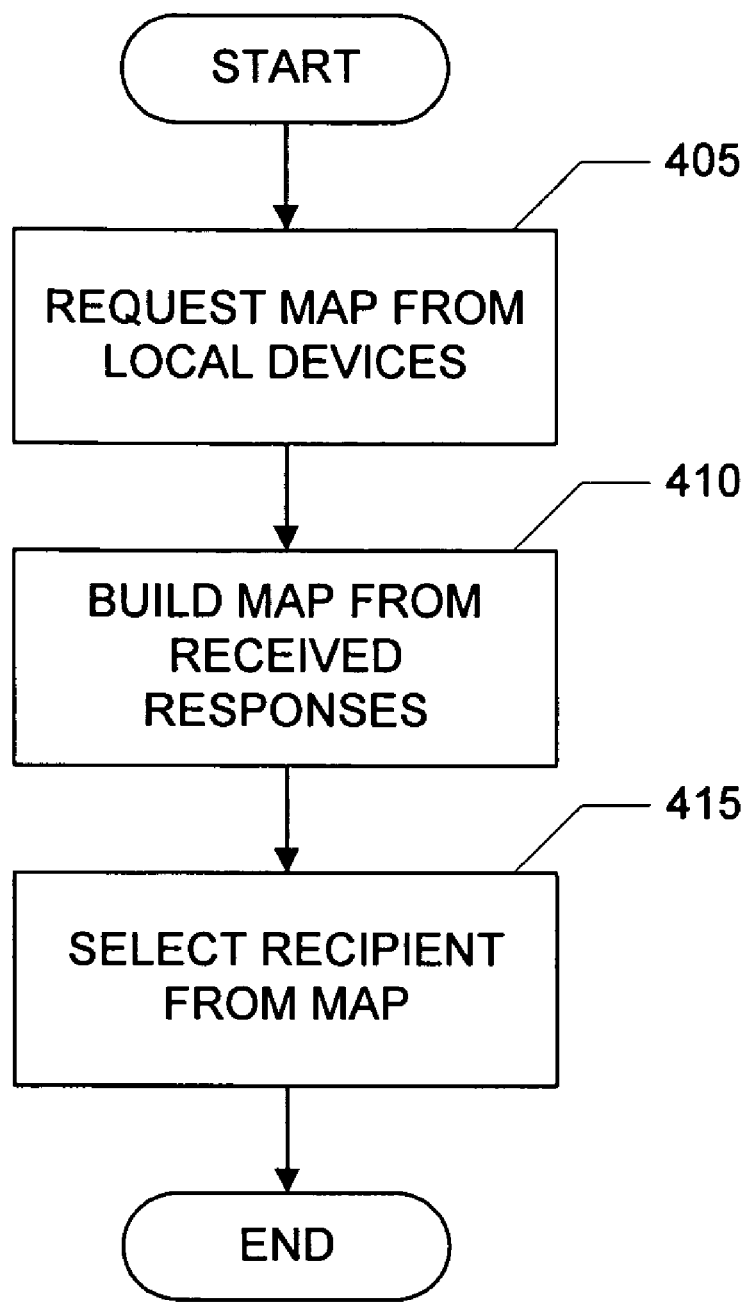
FIG. 4 shows a flowchart of one implementation of selecting a recipient using a recipient map.

FIG. 4 shows a flowchart 400 of one implementation of selecting a recipient using a recipient map, such as to select a recipient in block 305 of FIG. 3. Initially, a wireless device supporting relay communication is participating in a peer-to-peer network. The wireless device has built a list of local devices (e.g., using a beacon) and opened direct connections to those local devices. The wireless device has received a request from a user to select a recipient.

The wireless device requests a recipient map from each of the local devices, block 405. A recipient map indicates one or more devices and a full or partial path for each of the devices that is not local to the owner of the map. The owner of the map is the device that built the map and upon which the paths are based. Accordingly, a path indicates one or more corresponding connections or intermediary devices between the owner of the map and the particular recipient for that path. A full path shows all the intervening connections or devices and a partial path shows one or more of the intervening connections or devices, such as the final one. In one implementation, a recipient map is a graph, with nodes indicating devices and links indicating connections. In one implementation using a graph, the map does not indicate an owner. In another implementation, a recipient map is a table, with one entry for each recipient and a field indicating a path from the owner to the corresponding recipient. The local devices return their recipient maps to the wireless device. In one implementation, the local devices update their maps before returning them. In one implementation, the map request is a request for a map or alternatively to build a new map if the current map is too old. In another implementation, the map request is sent as a broadcast, rather than to specific local devices. Examples of building maps are described further below.

The wireless device builds a recipient map based on the received responses to the map requests, block 410. The wireless device combines the received maps and its own local device list to build a map with the wireless device as the owner (so that paths are defined relative to the wireless device). In another implementation, the wireless device does not send a map request or build a new recipient map if the wireless device already has a recipient map and that map is current (e.g., as determined using an expiration threshold and a creation or last update timestamp of the map).

The wireless device selects a recipient from the map, block 415. The wireless device presents the map to the user through the user interface of the wireless device. The user selects a recipient and the wireless device selects a recipient corresponding to the user selection.

Various techniques can be used to build recipient maps or lists (the techniques may apply to either or both of list and maps, as appropriate). Several examples are described below, including: propagation, hop count, network identifier, and periodic updating. Combinations of these or other building techniques can also be used.

In one implementation, a device updates its recipient map using one or more update rules. One rule is to update the recipient map upon joining the environment. Another rule is to update the recipient map at regular intervals. The device sends out a map request when the recipient map has expired, based on a comparison of the elapsed time since the last update of the recipient map. Another rule is to update the recipient map when a local device becomes unavailable. When the device detects that a local device is no longer available (e.g., based on regular polling or a failure to respond to a request), the device sends out a map request. Another rule is to update the recipient map when a new local device becomes available. Another rule is to update the recipient map when the device receives a refresh message from a local device indicating that local device has updated its recipient map. When a device has changed its recipient map, the device sends a refresh message to each of its local devices. The devices receiving the refresh message then each send out map requests to update their recipient maps. One or more of these or various other rules can be used to build, update, and maintain recipient maps.

FIG. 5 shows an example of one network configuration 500 as a graph of nodes and links. Example of map building are described below referring to the configuration of FIG. 5. Each node represents a device and each link between nodes represents a direct connection between two devices. Each of the nodes are labeled with a letter for the corresponding device. For example, a device X corresponds to the node labeled X. In FIG. 5, the device X has direct connections with three devices: A, B, and C. The device X is a wireless device and the limit of the range of the device X is indicated by the dashed circle 510 centered on the node X. The device X cannot establish direct wireless connections with devices outside its range. For example, the device D is outside the range of the device X (as indicated by the node D being outside the dashed circle 510). Similarly, the other devices have also established direct connections with the devices that are in range. In another configuration, some or all of the devices are wired devices and limit establishing direct connections on some other basis (e.g., an artificial limit such as a local device limit set by a user).

Propagation

In one implementation of building a map, the devices in the peer-to-peer network use propagation to build and update maps. Initially, a device builds a map request and sends the map request to each of its local devices. A map request requests a map of available devices and has an identifier to identify the request. Each of the local devices receiving the map request in turn sends a map request to that device's local devices using the same map request identifier, but does not send a map request back to the sender of the map request and does not send a map request when the device has already sent a map request having the same identifier. The devices receiving the map request follow a similar process to send out map requests. To send a map back to the sender of the request, a device waits for a response from each of the local devices to which the device sent the map request. If a device receives a map request with the same identifier as a previously received map request, the device sends back a failure message. If a device has no available local devices to which to send the map request (e.g., the only local device is the sender of the map request), the device returns the device's local device list to the sender of the map request or builds and returns a map based on the local device list. After receiving responses from each of the local devices to which the device sent the map request (discarding failure messages), the device combines the information of the received maps (if any) with the device's local device list to build (or update) its map. The device then returns the new map to the sender of the map request. This process continues until the original sender of the map request has received maps from its local devices and built its own map.

Referring to FIG. 5, in an example of building a map using the propagation technique described above, the device X sends a map request to each of its local devices: to the devices A, B, and C. The device A sends a map request to its local devices, except for the device X as the sender of the map request: to the devices D and E. The map request sent by device A includes the same map request identifier as that in the map request sent by the device X, and so will all the map requests propagated from the original map request sent by the device X. The device D receives the request from the device A and sends a map request to the device E (not to the device A because the device D received the map request from the device A). Similarly, the device E sends a map request to the device D. When the device D receives the map request from the device E, the device D recognizes that this map request is the same as the map request the device D received from the device A and then sent to the device E (by matching map request identifiers). Accordingly, the device D sends a failure message (or some message indicating the map request has already been sent) back to the device E. Similarly, the device E sends a failure message back to the device D. When the device D receives the failure message from the device E, the device D recognizes that there are no more pending responses (because the device D sent the map request only to device E). The device D has not received any maps as responses and so sends back its local device list (indicating devices A and E) to the device A as the response to the map request from the device A. Similarly, the device E returns its local device list to the device A (indicating the devices D and A). The device A recognizes it has received all its pending responses and builds a map from the received responses and its local device list. The map the device A builds indicates: the device D is available as a recipient through a connection from the device A to the device D, the device E is available as a recipient through a connection from the device A to the device E, and the device A is available as a recipient (e.g., as D-A, E-A, and A). When two maps provide alternate paths to the same device, the shorter path is used (measured by more intermediary devices being considered longer). When two paths are the same length, an arbitrary selection is made, or both paths are included. Accordingly, the device A does not indicate in its map to return to the device X that a path is available from the device D to the device E because there is a direct path from the device A to the device E.

The device B receives the map request from the device X and sends a map request to the device C. However, the device C has already received the map request from the device X and so sends a failure message back to the device B. The device B has no more pending responses and has not received any maps, so the device B returns its local device list to the device X: the devices X and C. Alternatively, rather than sending back the local device list, the device B returns a map indicating: the device C is available as a recipient through a connection from the device B to the device C, and the device B is available as a recipient (e.g., C-B and B).

The device C receives the map request from the device X and sends a map request to its local devices except the device X: the devices B, F, and G. The device B returns a failure message. The device F in turn sends a map request to its local devices: the devices H, I, and G. The device G sends a map request to its local devices: the devices F, I, J, and K. The devices continue to propagate the map requests, and build and return maps as described above. When the device C has received its pending responses to the send map requests, the device C builds a map indicating (using the example notation described above): L-H-F-C, M-H-G-C, H-F-C, I-F-C, J-G-C, K-G-C, F-C, G-C, and C.

When the device X has received the pending responses from the devices A, B, and C, the device X combines the responses and its local device list to build a map indicating these recipients and paths: A, B, C, D-A, E-A, F-C, G-C, H-F-C, I-F-C, J-G-C, K-G-C, L-H-F-C, and M-H-G-C. Using this map, the device can present the available recipients in various ways: as a graphical map (e.g., showing connections), as a list or recipients, as a list with a distance indicator (e.g., number of connections to reach or color code). If the user selects the device H as a recipient, for example, the device X can include in the relay message to the device H the path to the device H: X to C to F to H. When the device X sends the relay message, the device X uses the path information and sends the relay message to the device C, and not to the other local devices A and B. Similarly, the device C passes the relay message to the device F (not B or G), and so on.

In another implementation, the wireless device uses a recipient list instead of a map. A recipient list indicates the available recipients, but does not indicate path information (explicitly). One type of recipient list does indicate whether a recipient is a local device or not, relative to the owner of the list. Using the propagation technique described above, the devices return lists rather than maps and the device X builds a list indicating the devices: A, B, C, D, E, F, G, H, I, J, K, L, and M.

In another implementation, the device maintains redundant path information. The device stores a recipient map indicating available paths and applies a filter to remove redundant paths when presenting the map for recipient selection. If another device in the map becomes unavailable, the device can use the redundant path information to identify other paths to devices that were shown as being connected through the unavailable device. For example, in FIG. 5, there are two paths from the device I to the device X: I-F-C-X and I-G-C-X. If the filter of the device X has selected the first path through the device F for display in recipient selection, the second path through the device G is redundant and is not displayed. If the device F becomes unavailable, the device X can display the second path through the device G as available because the device X has maintained the redundant path information.

Hop Count

In another implementation, the devices use a hop count as a limit of how far out (across how many connections) to propagate the map request or list request. Various definitions of "hop" can be used. In one definition, a hop is a connection or link between two devices. Referring to the configuration shown in FIG. 5, the connection between the device X and the device C is 1 hop. In the path between the device X and the device H, there are 3 hops. In another definition, a hop is a connection between two intermediary devices along a path. Referring to FIG. 5, in the path between the device X and the device H, there is 1 hop. The connection between the device X and the device C is not a hop because the device X is not an intermediary device. The connection between the device C and the device F is a hop because the devices C and F are intermediary devices. The connection between the devices F and H is not a hop because the device H is the recipient and not an intermediary device. Accordingly, the hop count for the path between the device X and the device H is 1. In other implementations, different definitions of hop count can be used, such as every connection after the first being counted as a hop (in which case the hop count between the devices X and H would be 2).

When the hop count reaches a threshold, a device will not send another map or list request. In an example using list requests and where the hop count is limited to 3, a device will not send a list request when the hop count has reached 3. This limit of 3 will build a list where all of the recipients are 3 hops or less away. The hop count is included in the list request. Using a definition of hops where each link is a hop, the hop count is initially 1 and is incremented by 1 when a device sends the list request to another device (e.g., incremented by the sender). Referring again to FIG. 5, when the device X sends the list request to the device C, the hop count is incremented by 1 to be 2. When the device C sends the list request to the device F, the hop count increases to 3. The hop count has reached the limit of 3. Accordingly, the device F does not send the list request to its local devices (G, H, I), and instead returns its local device list to the device C. Following that pattern, when the device X has received its pending responses from the list requests sent out to the devices A, B, and C, the device X builds a list indicating: A, B, C, D, E, F, G, H, I, J, and K. The list does not include the devices L and M because the device H did not receive a list request.

Network Identifier

In another example of controlling the building of recipient maps or lists, the requests include a network identifier. Each of the devices participating in the network stores the same network identifier. When a device sends a map or list request, the device includes that network identifier in the request. If a device receives a map or list request indicating a network identifier different from that of the device, the device returns a decline message to the sender indicating the device is not a participant in that network. When a device receives that decline message, the device does not include the device sending the decline message in the list or map of available recipients. Network participation can be managed through a server or through self-regulation of participating devices (e.g., by invitation or request and acceptance).

Periodic Updating

In another implementation of building a recipient map or list, a device uses periodic updating to build a map or list by periodically requesting a list from each of its local devices (or on demand). A device does not propagate the request. A device returns its current recipient list to the requesting device. When a device receives the responses, the device updates its recipient list by combining the responses with its local device list. When a device later receives a list request from a local device, the device will return the updated recipient list. In this way the recipient lists for each of the devices gradually develop and include all the available devices. A similar approach can be used with maps. Using the path information in a map, changes in available devices can be applied to the map. Referring again to FIG. 5, if the device X has a complete recipient list (including devices A-M) and receives an update indicating that device C is no longer available, the device X can use the path information to determine that devices F-M are also not available because the device C provided the link to those devices. In one implementation, removing connected devices can prompt a device to send out a new map request (e.g., using a propagation technique).

Various other techniques can be used to build and update recipient maps and lists. For example, in another approach, wireless devices periodically broadcast their local device lists or recipient lists (or maps) and other devices update their list and maps accordingly. In another example, a server provides lists, maps, and/or paths, though communication between devices remains peer-to-peer (direct or relay).

Figure 6:
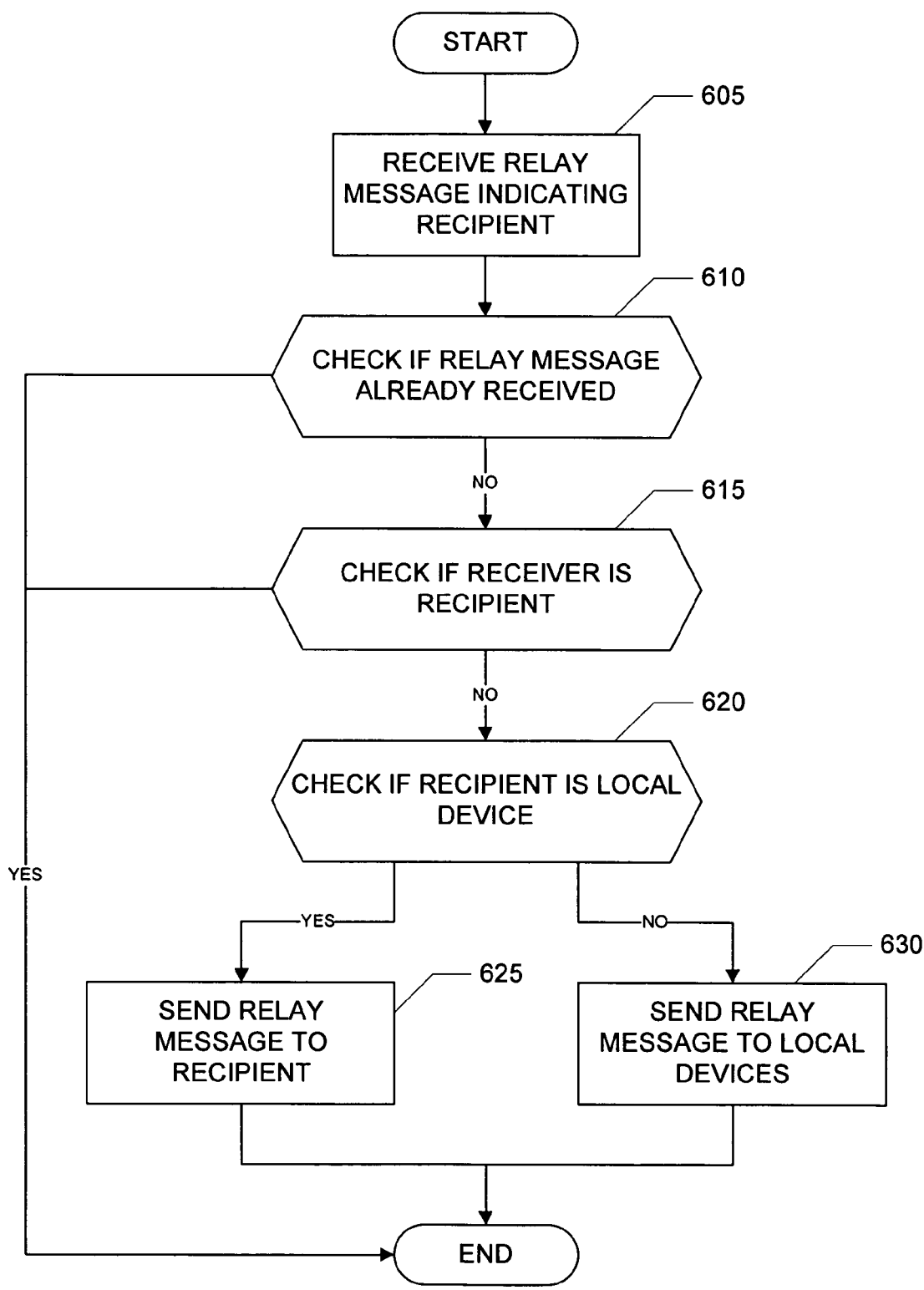
FIG. 6 shows a flowchart of one implementation of sending a relay message from an intermediary or relay device.

FIG. 6 shows a flowchart 600 of one implementation of sending a relay message from an intermediary or relay device. Initially, a wireless device supporting relay communication is participating in a peer-to-peer network. The wireless device may or may not be executing an application program. The wireless device has built a list of local devices (e.g., using a beacon) and opened direct connections to those local devices.

The wireless device receives a relay message from one of the wireless device's local devices, block 605. The wireless device receives the relay message through the wireless interface of the wireless device. The wireless device recognizes that the relay message is a relay message because the relay message includes a relay message code. For relay messages including application program data, the wireless device is not necessarily executing a local copy or version of the application program corresponding to the application data in the relay message, and may be executing an application program different from the application program corresponding to the application data included in the relay message. When appropriate, however, the wireless device can store or use application data in the relay message (e.g., if the wireless device is also executing that application program or a related application program).

The wireless device checks whether the relay message has already been received by the wireless device, block 610. The wireless device retrieves the relay message identifier from the relay message and compares the retrieved identifier to a received relay message list of stored relay message identifiers (stored from previously received relay messages). If the identifier matches an identifier in the stored received relay message list, the wireless determines that the relay message has been received previously and discards the relay message. If the identifier does not match any in the list, the wireless device determines that this relay message is a new relay message and adds the relay message identifier to the received relay message list.

If the relay message is a new relay message, the wireless device checks whether the wireless device is the indicated recipient for the relay message, block 615. The wireless device retrieves the recipient information from the relay message and compares that recipient information with information identifying the wireless device. If the wireless device is the indicated recipient, the wireless device does not relay the relay message and proceeds with accessing and processing the payload data of the relay message (e.g., using the payload data as application data for an executing game application program). If the relay message indicates multiple recipients (e.g., the wireless device and at least one additional device), the wireless device processes the payload data and sends the relay message on, proceeding to block 620.

If the wireless device is not the indicated recipient for the relay message, the wireless device checks whether the indicated recipient is a local device for the wireless device, block 620. The wireless device compares the recipient information with the wireless device's local device list.

If the recipient is one of the local devices, the wireless device sends the relay message to the recipient through the wireless interface, block 625. If the recipient is not one of the local devices, the wireless devices sends the relay message to each of the local devices, except for the local device that sent the relay message to the wireless device, block 630. In an implementation using paths, if the relay message includes path information indicating the next intermediary device and so to which local device the wireless is to send the relay message, the wireless message sends the relay message to the indicated intermediary device.

The process described referring to FIG. 6 follows one set of relay rules (e.g., do not send the same relay message twice). In other implementations using a different set of rules (or only one rule or no rules), the process for determining how to handle a relay message can be different. For example, in one implementation, before sending a relay message on, the intermediary device checks an updated map or list of recipients to confirm that the indicated recipient is still available. In another example, if an intermediary device has not already sent the same relay message, the relay message is always broadcast (e.g., not to specific devices, but to all devices in range).

The various implementations of the invention are realized in electronic hardware, computer software, or combinations of these technologies. Some implementations include one or more computer programs executed by a programmable processor or computer. For example, referring to FIG. 1A, in one implementation, the wireless device 105 includes one or more programmable processors (e.g., implementing the controller 220 of FIG. 2). In general, each computer includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copied into memory at run-time. The processor executes the code by retrieving program instructions from memory in a prescribed order. When executing the program code, the computer receives data from the input and/or storage devices, performs operations on the data, and then delivers the resulting data to the output and/or storage devices.

Various illustrative implementations of the present invention have been described. However, one of ordinary skill in the art will see that additional implementations are also possible and within the scope of the present invention. For example, while the above description focuses on implementations using wireless devices, wired or multi-interface devices (e.g., wired and wireless) can be used.

In addition, rather than exchanging relay message to support game application programs, other application programs can also be supported, such as such as scientific, communications, etc. In that case, the payload data of the relay messages would reflect the nature of the application programs being addressed (e.g., most recent network test results for network analysis application programs).

Accordingly, the present invention is not limited to only those implementations described above.

What is claimed is:

1. A method of sending a relay message, comprising:
   contacting local devices, which are devices that are within range of a sending device through a wireless interface, and requesting identification of available devices;
   propagating by the local devices the request for identification of available devices through a peer-to-peer network;
   returning the identification of available devices to the sending device;
   building a list of available devices, the list including identification of said local devices in a local device list;
   receiving a relay message from the sending device through a wireless interface at a relaying device, wherein said relay message includes a recipient identifier indicating a recipient device and includes application data for an application program;
   checking said relay message to determine whether said relaying device is said recipient device, wherein when the relaying device is the recipient device, the relaying device does not relay the relay message;
   checking, when the relaying device is not the recipient device, the local device list indicating at least one local device to determine whether said recipient device is a local device;
   when said recipient device is a local device, sending said relay message from said relaying device addressed only to said recipient device through said wireless interface and not sending said relay message addressed to other local devices; and
   when said recipient device is not a local device, sending said relay message from said relaying device addressed to at least one local device included in said local device list through said wireless interface;
   wherein said sending device has a direct connection to said relaying device, said relaying device has a direct connection to each local device indicated in said local device list, and said sending device does not have a direct connection to said recipient device.

2. The method of claim 1, wherein:
   sending said relay message from said relaying device to at least one local device includes broadcasting said relay message through said wireless interface.

3. The method of claim 1, wherein:
   sending said relay message from said relaying device to at least one local device includes sending said relay message to each local device in said local device list except said sending device.

4. The method of claim 1, wherein:
   said relaying device does not send said relay message if said relaying device has already sent said relay message.

5. The method of claim 1, wherein:
   said relay message indicates a path including at least one intermediary device, and sending said relay message from said relaying device to at least one local device includes sending said relay message to an intermediary device indicated by said path.

6. The method of claim 1, wherein:
   said application data is game application data.

7. The method of claim 1, wherein:
   said relaying device is not executing a local copy of said application program corresponding to said application data included in said relay message.

8. The method of claim 1, wherein:
   said relaying device is executing a local copy of an application that is different from said application program corresponding to said application data included in said relay message.

9. A system for sending a relay message, comprising:
   means for contacting local devices, which are devices that are within range of a sending device through a wireless interface, and requesting identification of available devices;
   means for propagating by the local devices the request for identification of available devices through a peer-to-peer network;
   means for returning the identification of available devices to the sending device;
   means for building a list of available devices, the list including identification of said local devices in a local device list;
   means for receiving a relay message from the sending device through a wireless interface at a relaying device, wherein said relay message includes a recipient identifier indicating a recipient device and includes application data for an application program;
   means for checking said relay message to determine whether said relaying device is said recipient device, wherein when the relaying device is the recipient device, the relaying device does not relay the relay message;

means for checking, when the relaying device is not the recipient device, the local device list indicating at least one local device to determine whether said recipient device is a local device;

means for sending said relay message from said relaying device addressed only to said recipient device through said wireless interface when said recipient device is a local device and not sending said relay message addressed to other local devices; and means for sending said relay message from said relaying device addressed to at least one local device included in said local device list through said wireless interface when said recipient device is not a local device;

wherein said sending device has a direct connection to said relaying device, said relaying device has a direct connection to each local device indicated in said local device list, and said sending device does not have a direct connection to said recipient device.

10. A non-transitory computer-readable medium storing a computer-readable program the program comprising executable instructions that cause a computer to:

contact local devices, which are devices that are within range of a sending device through a wireless interface, and requesting identification of available devices;

propagate by the local devices the request for identification of available devices through a peer-to-peer network;

return the identification of available devices to the sending device;

build a list of available devices, the list including identification of said local devices in a local device list;

process a relay message received from the sending device through a wireless interface at a relaying device, wherein said relay message includes a recipient identifier indicating a recipient device and includes application data for an application program;

check said relay message to determine whether said relaying device is said recipient device, wherein when the relaying device is the recipient device, the relaying device does not relay the relay message;

check, when the relaying device is not the recipient device, the local device list indicating at least one local device to determine whether said recipient device is a local device;

when said recipient device is a local device, send said relay message from said relaying device addressed only to said recipient device through said wireless interface and not send said relay message addressed to other local devices; and when said recipient device is not a local device, send said relay message from said relaying device addressed to at least one local device included in said local device list through said wireless interface;

wherein said sending device has a direct connection to said relaying device, said relaying device has a direct connection to each local device indicated in said local device list, and said sending device does not have a direct connection to said recipient device.

\* \* \* \* \*